United States Patent Office 3,481,966
Patented Dec. 2, 1969

3,481,966
ORGANOSILICON POLYMERS USEFUL AS SURFACTANTS IN THE MANUFACTURE OF POLYURETHANE FOAMS
Ronald Sangster Stuart, Saltcoats, Scotland, assignor to Imperial Chemical Industries Limited, Millbank, London, England, a corporation of Great Britain
No Drawing. Filed Jan. 23, 1967, Ser. No. 610,773
Claims priority, application Great Britain, Jan. 21, 1966, 2,841/66
Int. Cl. C08f *11/04;* C07f *7/18*
U.S. Cl. 260—448.8         13 Claims

ABSTRACT OF THE DISCLOSURE

There is provided an organosilicon polymer which has the general unit formula

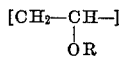

and in which at least a majority of the groups R have the general formula

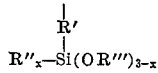

Representative of remaining R groups are substituted and unsubstituted alkyl and aryl groups. Other remaining R groups may be polyoxyalkylene groups. Representative of the R' groups are alkylene groups having at least 2 carbon atoms and representative of R'' groups are substituted and unsubstituted alkyl and aryl groups. Representative R''' groups are alkyl, aryl and alkenyl groups. The organosilicon polymers of the present invention are useful as surfactants in the manufacture of polyurethane foams.

---

This invention relates to new and useful organosilicon polymers and to the use of such polymers, for example, as surfactants in the manufacture of polyurethane foams.

A wide variety of organosilicon polymers are known and are readily available. These have many valuable and important uses in a large variety of applications among which is included their use as surfactants, for example, for use in the production of polyurethane foams.

According to the present invention new and useful organosilicon polymers comprise polymers having the general unit formula

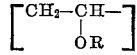

in which at least one group R has the general formula

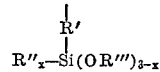

and of the remaining R groups at least one is a hydrocarbyl or substituted hydrocarbyl group and any remaining R groups may be polyoxyalkylene groups of the formula $(C_nH_{2n}O)_yR^{IV}$ where $n$ is 2, 3 or 4, $y$ is an integer from 2 to 100 inclusive and $R^{IV}$ is a hydrocarbyl group, a substituted hydrocarbyl group or an acyl group, R' is an alkylene group having at least 2 carbon atoms, R'' is a hydrocarbyl or substituted hydrocarbyl group, R''' is a hydrocarbyl group, a substituted hydrocarbyl group or a polyoxyalkylene group of the kind described and at least one group R''', is a polyoxyalkylene group of the kind described, except when the polymer contains one or more other such units in which R is such a polyoxyalkylene group and $x$ is 0.1 or 2.

Some of the groups R present in addition to the essential ones may be polyoxyalkylene groups of the general formula $(C_nH_{2n}O)_yR^{IV}$, in which $n$, $y$ and $R^{IV}$ are as hereinbefore defined. When such groups are present none of the groups R''' need be polyoxyalkylene groups and they may thus all be hydrocarbyl or substituted hydrocarbyl groups. Additionally in such cases $x$ may be 3.

The proportions of the various forms of the group R may vary widely it being essential only that at least one is of the general formula

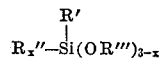

at least one is a hydrocarbyl or substituted hydrocarbyl group and that at least one R''' or one R is a polyoxyalkylene group of the general formula $(C_nH_{2n}O)_yR^{IV}$. It is, however, in general, preferred that at least a majority of the groups R are of the general formula specified.

When the group R is a hydrocarbyl or substituted hydrocarbyl group it may be selected from alkyl, aryl, alkaryl or aralkyl groups. There may also be present a proportion, preferably not more than 25 percent, of alkenyl or cycloalkenyl groups. There may also be present substituents, such as, for example, chlorine, cyano, hydrocarbyloxy, carbohydrocarbyloxy or polyoxyalkylene groups. Suitable groups which may be used include, for example, methyl, ethyl, n-propyl, isopropyl, n-butyl, isobutyl, iso-octyl, cyclohexyl, phenyl, toyly, naphthyl, benzoyl, vinyl, allyl, stearyl, cyclohexenyl, γ-chloropropyl, p-chlorophenyl, β-cyanoethyl and β-methoxyethyl groups.

The groups R' may be linear or branched alkylene groups of the general formula $(CH_2)_z$ where $z$ is an integer at least 2 and preferably not greater than 20. It is further preferred that $z$ be 3.

The groups R'' may be any hydrocarbyl or substituted hydrocarbyl group such as an alkyl, aryl, alkaryl or aralkyl groups some or all of which may contain substituents such as chlorine or cyano groups. Suitable groups include for example, methyl, ethyl, n-propyl, isopropyl, n-butyl, cyclohexyl, phenyl, tolyl, benzyl, phenylethyl, γ-chloropropyl, p-chlorophenyl and β-cyanoethyl groups. It is in general preferred that at least the majority of the groups R'' be methyl groups.

The groups R''' may be hydrocarbyl or substituted groups, such as alkyl, aryl, alkaryl or aralkyl groups, suitable substituents being such as chlorine, cyano, hydrocarbyloxy, aryloxy or carbo-hydrocarbyloxy groups or may be polyoxyalkylene groups of the general formula $(C_nH_{2n}O)_yR^{IV}$. Suitable hydrocarbyl or substituted hydrocarbyl groups include, for example, methyl, ethyl, n-propyl, isopropyl, n-butyl, isobutyl, iso-octyl, cyclohexyl, phenyl, tolyl, naphthyl, γ-chloropropyl, p-chlorophenyl, β-cyanoethyl, β-methoxyethyl, acetoxy and carboethoxy groups.

In the polyoxyalkylene groups the units $(C_nH_{2n}O)$ may be oxyethylene, oxy-1,2-propylene, oxy-1,3-propylene, oxy-1,2-butylene, oxy-1,4-butylene units or a mixture of any two or more of these arranged either randomly or in blocks. The group $R^{IV}$ may be a hydrocarbyl or substituted hydrocarbyl group as described for R''' or an acyl group, for example, an acetyl, propionyl, butyryl or benzoyl group.

In one method of producing polymers of our invention, a vinyl ether of formula CH=CHOR, where R is a hydrocarbyl or substituted hydrocarbyl group, is copolymerised under suitable conditions for vinyl ether polymerisation with another vinyl ether of formula $$CH=CHOR^V$$

where $R^V$ is an alkenyl group, in many cases preferably an allyl group, and the product so obtained thereafter further reacted. The further reaction may be a one stage reaction with a silane of the general formula

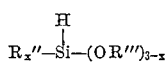

in which R″, R‴ and $x$ are as hereinbefore defined. This may be carried out by the known methods for reaction between a compound having a >C=C< group and a compound having a ≡SiH group, for example, in presence of a platinum catalyst. In the silane a proportion of the R‴ groups may be polyoxyalkylene groups or, alternatively, these may be introduced subsequently. In another alternative the copolymerisation product may be reacted with a halogenosilane of general formula

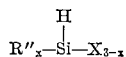

where X is a halogen, for example, chlorine and the reaction product thereafter reacted with a suitable mono-ol of formula R‴OH in presence of an acid acceptor such as, for example, pyridine or dimethylaniline. The groups $R^V$ in the copolymer may, of course, be in excess of the molecules of silane used and, if desired, the necessary polyoxyalkylene groups R may be attached thereto for example, by a reaction involving a >C=C< group such as epoxidation followed by reaction with a polyoxyalkylene mono-ol or by the introduction of a hydroxy group followed by oxyalkylation and blocking of any remaining hydroxy groups by a group R‴, preferably by acylation, it being necessary that there be at least one polyoxyalkylene group per molecule either as R‴ or R in the product.

In another method of preparing polymers according to our invention a mixture of vinyl ethers of general formula $CH_2$=CHOR and $CH_2$=CHOR$^V$ as described, with a polyoxyalkylene vinyl ether of general formula $CH_2$=CH—O($C_nH_{2n}$O)$_y$R$^{IV}$, where R$^{IV}$, $n$ and $y$ are as hereinbefore defined are first copolymerised. The product so obtained is then reacted with a suitable silane as before.

The copolymerisation of vinyl ethers is carried out in presence of a catalyst, of the kind known for this purpose, such as transition metal halides, for example, ferric chloride and Lewis acids, for example, the etherate of boron trifluoride. The copolymerisation is normally also carried out in solution in a solvent, which may be a hydrocarbon, for example, n-hexane, n-heptane, benzene, toluene or an ether, for example, diethyl ether or di-n-butyl ether. The solvent and reaction conditions chosen will normally depend on the nature of the vinyl ethers and catalyst used. The temperature used may be in the range of, for example, —50 to 200° C.

The introduction of the polyoxyalkylene group attached through oxygen to a silicon atom may be carried out by transesterification using a catalyst of known type, for example, a strong organic acid such as trifluoroacetic, a mixture of such an acid or an alkali metal salt thereof.

The polyoxyalkylene content of the copolymer may vary widely, for example, from 5 to 95 percent by weight thereof. It is generally preferred, however, that it should be from 25 to 90 percent. The amount in any specific copolymer will, of course, depend on the reactants used and their proportions and these will in general be selected according to the properties desired in the final product. The molecular weight of the copolymer may also vary widely. It is, however, normally preferred that it be in the range 1,000 to 20,000.

Copolymers which are water soluble can be obtained by incorporation of a suitable proportion of oxyethylene units. The proportion required to give water solubility will, of course, vary with the nature and amount of other organic groups present. The water solubility will be similar to that of non-ionic organic materials having the same oxyethylene content. In general products having oxyethylene contents from about 28 percent by weight upwards will have some degree of water solubility. The product will also have an inverse temperature solubility coefficient. These water soluble products have the inverse solubility of/temperature characteristics typical of polyoxyethylene containing materials.

The copolymers of our invention are suitable for a wide variety of uses. One of the more important of these is as a surfactant in the manufacture of polyurethane foams.

In using the products of our invention in polyurethane foam manufacture the known techniques may be followed. Thus the process may be one-stage or two-stage. Our products are, however, specially valuable as foam stabilising agents in the one-stage process for the preparation of foams from polyethers in which a major proportion of the hydroxyl end groups are secondary hydroxyl groups.

Our invention is further illustrated by the following Examples in which all parts and percentages are by weight.

EXAMPLE 1

21 parts of allyl vinyl ether dissolved in 50 parts of n-butyl vinyl ether were added over a period of 45 minutes to 0.02 part of anhydrous ferric chloride in 200 parts of dry n-heptane maintained at 40–45° C. in an inert atmosphere. The mixture was heated at 60° C. for 15 minutes, cooled to 20° C. and 100 parts of diethyl ether added thereto. The mixture was then washed with dilute sodium carbonate solution followed by distilled water after which all matter volatile up to 100° C. to 12 mm. Hg pressure was removed by distillation. There were thus obtained 50 parts of a clear, colourless, homogeneous oily liquid 2:1 (molar) copolymer of n-butyl vinyl ether and allyl vinyl ether of M.W. 612 and $n_D^{20}$ 1.4563 containing >C=C< groups (confirmed by infrared spectroscopy).

A solution of 0.0174 part of a complex of cyclohexene and platinous chloride in 8 parts of dry benzene was added to 10 parts of the so prepared poly(vinyl)ether copolymer and 8.8 parts of tri-isobutoxysilane in 25 parts of dry toluene at a temperature of 50° C. The mixture was thereafter heated under reflux for 4 hours in an inert atmosphere.

The solution was treated with charcoal, cooled and filtered through "Celite" after which all matter volatile up to 100° C. at 12 mm. Hg pressure was removed by distillation. There were thus obtained 14.5 parts of a clear, colourless, homogeneous, viscous liquid adduct having $n_D^{16.5}$ 1.4461 and a silicon content of 5.25 percent.

16.5 parts of a polyether mono-ol of average molecular weight 1650 and prepared by oxyalkylation of n-butanol with a mixture of equal parts of ethylene oxide and 1,2-propylene oxide were dissolved in 40 parts of toluene and the solution dried by azeotropic distillation. 10.64 parts of adduct prepared as above, 0.7 part of trifluoroacetic acid and 0.2 part of potassium hydroxide were added to the dried solution and the mixture heated at a 10:1 reflux ratio in an inert atmosphere for 1.5 hours to remove the isobutanol produced. The total amount of solution was maintained constant by the simultaneous addition of fresh dry toluene. The solution was cooled, neutralised with anhydrous sodium carbonate and filtered after which all matter volatile up to 100° C. at 12 mm. Hg pressure was removed by distillation. There were thus obtained 23 parts of a silicon-containing poly(vinyl ether)-polyoxyalkylene copolymer in the form of a clear, red-brown, water soluble, viscous liquid, $n_D^{17}$ 1.4597, silicon content 2.1 percent and polyoxyalkylene content approximately 60 percent.

100 parts of oxypropylated glycerol of molecular weight 3,000, 49.7 parts of an 80:20 mixture of 2,4- and 2,6-tolylenedi-isocyanate, 4 parts of water, 0.3 part of stannous octoate, 0.08 part of triethylenediamine and 2 parts of the silicon-containing poly(vinyl ether) polyoxyalkylene copolymer prepared as described above were mixed together. There was thus obtained a resilient polyurethane foam of fine, even texture and density 1.7 lb./cu. ft.

EXAMPLE 2

21 parts of allyl vinyl ether in 50 parts of isobutyl vinyl ether were added over a period of 30 minutes to 0.02 part of anhydrous ferric chloride in 200 parts of pure dry n-heptane maintained at 53–57° C. and in an inert atmosphere. The mixture was heated at 80–90° C. for 10 minutes, cooled to 20° C. and 100 parts of diethyl ether added thereto. The mixture was washed with dilute aqueous sodium carbonate and distilled water after which all matter volatile up to 100° C. at 12 mm. Hg pressure was removed by distillation. There were thus obtained 58.7 parts of a clear, colourless, viscous liquid 1:2 (molar) copolymer of isobutyl vinyl ether and allyl vinyl ether of molecular weight 3,170 and $n_D^{25}$ 1.4533.

0.0174 part of a complex of cyclohexane and platinous chloride in 8 parts dry benzene were added to 10 parts of the so prepared poly(vinyl ether) copolymer and 11.55 parts methyl di-iso-butoxy silane in 25 parts of dry toluene maintained at 50° C. The mixture was then heated under reflux in an inert atmosphere for 6 hours. The toluene solution was treated with charcoal and filtered through "Celite" after which all matter volatile up to 100° C. at 6 mm. Hg pressure was removed by distillation. There were thus obtained 14.75 parts of a clear, pale straw coloured, viscous liquid adduct having $n_D^{22}$ 1.4309 and silicon content 5.9 percent. The absence of >C=C< groups was confirmed by infra-red spectroscopy.

16.5 parts of the oxyalkylated n-butanol used in Example 1 were dissolved in 35 parts of dry toluene and the solution dried by azetotropic distillation. 9.46 parts of adduct prepared as described above, 0.7 part of trifluoroacetic acid and 0.2 part of potassium hydroxide were then added and the mixture distilled at a 10:1 reflux ratio in an inert atmosphere for 1.5 hours to remove the isobutanol formed. The total amount of solution was maintained constant by the simultaneous addition of fresh dry toluene. The toluene solution was cooled to 20° C., neutralised with anhydrous sodium carbonate and filtered, after which all matter volatile up to 100° C. at 6 mm. Hg pressure was removed by distillation. There were thus obtained 20.8 parts of a silicon-containing poly (vinyl ether) polyoxyalkylene copolymer in the form of a clear, golden brown, water soluble viscous liquid of silicon content 2.1 percent and polyether content approximately 65 percent.

The process of Example 1 for the preparation of a polyurethane foam was repeated except that 1 part of the silicon-containing poly vinyl ether) polyoxyalkylene copolymer prepared as described above was used in place of the silicon-containing poly (vinyl ether) polyoxyalkylene copolymer of Example 1. A similar fine celled, flexible polyurethane foam of density 1.7 lb./cu. ft. was obtained.

EXAMPLE 3

A mixture of 100 parts of vinyl allyl ether and 100 parts of the vinyl ether of polyoxyethylated ethyleneglycol monomethyl ether of average general formula $$CH_3OCH_2CH_2(OCH_2CH_2)_{10.8}OCH=CH_2$$

was added to a stirred solution of 20 parts of 10 percent diethyl ether complex of boron trifluoride in diethyl ether, dissolved in 680 parts of dry n-heptane, maintained at 55–57° C. in an atmosphere of nitrogen over a period of 20 minutes. The mixture was thereafter heated to 60° C. whilst stirring for 15 minutes and then to 80° C. for a further 15 minutes. After cooling to 25° C., a solution of 15 parts of concentrated aqueous ammonia in 50 parts of methanol was added, the mixture filtered and the solvent and volatile matter removed by distillation at 85° C. under vacuum to give a vinyl allyl ether/vinyl polyoxyethylene ether copolymer as a clear light brown viscous oil. The presence of allyl groups and polyoxyethylene groups in this material was confirmed by infra-red spectroscopy, and nuclear magnetic resonance spectroscopy.

100 parts of the so-prepared copolymer, 27.5 parts of methyl(di-isobutoxy)silane, 220 parts of toluene and 0.25 part of a cyclohexene platinous chloride complex were heated together under reflux whilst stirring continuously for 6 hours in an atmosphere of nitrogen. The toluene was then removed by distillation and unreacted methyl(diisobutoxy)silane removed from the residue by heating to a temperature of 100° C. under vacuum. In this way, 115 parts of a clear brown viscous oil were obtained.

40 parts of oxypropylated sorbitol of average molecular weight 685, 74.8 parts of crude 4,4'-di-isocyanatodiphenylmethane, 27.2 parts of trichlorofluoromethane, 40 parts of glycerol, 12 parts of tri-β-chloroethyl phosphate, 1.6 parts of a solution of 1 part of triethylenediamine in 2 parts of dipropyleneglycol and 0.4 part of the product prepared as described above were mixed together. There was thus obtained a rigid polyurethane foam of fine uniform cell structure and density 2.1 lb./cu. ft.

What I claim is:

1. An organosilicon polymer having the general unit formula

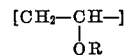

in which at least a majority of the groups R have the general formula

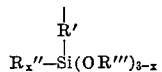

and of the remaining R groups at least one is selected from the group consisting of substituted and unsubstituted alkyl, aryl, alkaryl, aralkyl alkenyl and cycloalkenyl groups may substituents being selected from the group consisting of chlorine, cyano, hydrocarbyloxy, carbohydrocarbyloxy and polyoxyalkylene groups, any remaining R groups being polyoxyalkylene groups of the formula $(C_nH_{2n}O)_yR^{IV}$ where $n$ is 2, 3 or 4, $y$ is an integer from 2 to 100 inclusive and $R^{IV}$ is selected from the group consisting of acyl groups, substituted and unsubstituted alkyl, aryl, alkaryl, aralkyl, alkenyl and cyclo-alkenyl groups any substituents being selected from the group consisting of chlorine, cyano, hydrocarbyloxy and carbohydrocarbyloxy, R' is an alkylene group having at least 2 carbon atoms, R" is selected from the group consisting of substituted and unsubstituted alkyl, aryl, alkaryl, aralkyl, alkenyl and cyclo-alkenyl groups any substituents being selected from the group consisting of chlorine, cyano, hydrocarbyloxy, carbohydrocarbyloxy and polyoxyalkylene groups, R'" is selected from the group consisting of substituted and unsubstituted alkyl, aryl, alkaryl, aralkyl, alkenyl and cyclo-alkenyl groups, any substituents being selected from the group consisting of chlorine, cyano hydrocarbyloxy/hydrocarbyloxy, carbo-hydrocarbyloxy and polyoxyalkylene groups and polyoxyalkylene groups of the kind defined and at least one group R'" is a polyoxyalkylene group of the kind defined, except when the polymer contains one or more other units in which R is a polyoxyalkylene group of the kind defined, $x$ is 0, 1 or 2, the polyoxyalkylene content of the polymer being from 5 to 95 percent by weight.

2. A polymer according to claim 1 wherein all of the R'" groups are selected from the group consisting of substituted and unsubstituted alkyl, aryl, alkaryl, aralkyl, alkenyl and cyclo-alkenyl groups, any substituents being selected from the group consisting of chlorine, cyano, hydrocarbyloxy, carbo-hydrocarbyloxy and polyoxyalkylene groups.

3. A polymer according to claim 1 where $x$ is 3.

4. A polymer according to claim 1 wherein the group R' is a linear or branched alkylene group of the general formula $(CH_2)_z$, where $z$ is an integer not greater than 20.

5. A polymer according to claim 4 wherein $z$ is 3.

6. A polymer according to claim 1 where the group R" is selected from methyl, ethyl, n-propyl, isopropyl, n-butyl, cyclohexyl, phenyl, tolyl, benzyl, phenylethyl, γ-chloropropyl, p-chlorophenyl and β-cyanoethyl groups.

7. A polymer according to claim 6 wherein at least the majority of R" groups are methyl groups.

8. A polymer according to claim 1 wherein the groups R''' are selected from methyl, ethyl, n-propyl, isopropyl, n-butyl, isobutyl, iso-octyl, cyclohexyl, phenyl, tolyl, naphthyl, γ-chloropropyl, p-chlorophenyl, γ-cyanoethyl, β-methoxyethyl, acetoxy and carboethoxy groups.

9. A polymer according to claim 1 wherein the units $(C_nH_{2n}O)$ are oxyethylene, oxy-1,2-propylene, oxy-1,3-propylene, oxy-1,2-butylene, oxy-1,4-butylene units or a mixture of two or more of these arranged either randomly or in blocks.

10. A polymer according to claim 1 wherein the group $R^{IV}$ is an acyl group selected from the group consisting of an acetyl, propionyl, butyryl and benzoyl group.

11. A polymer according to claim 1 wherein the polyoxyalkylene content thereof is from 5 to 95 percent by weight.

12. A polymer according to claim 11 wherein the polyoxyalkylene is from 25 to 90 percent by weight.

13. A polymer according to claim 1 wherein the molecular weight is in the range from 1,000 to 20,000.

References Cited

UNITED STATES PATENTS

| 2,777,868 | 1/1957 | Mixer et al. | 260—448.2 |
| 2,777,869 | 1/1957 | Bailey et al. | 260—448.2 |
| 2,811,541 | 10/1957 | Carry | 260—448.2 |
| 2,897,222 | 7/1959 | Bailey | 260—448.2 |
| 2,970,150 | 1/1961 | Bailey | 260—448.8 XR |
| 3,110,689 | 11/1963 | Smith | 260—448.8 XR |
| 3,115,512 | 12/1963 | Rossmy et al. | 260—448.8 |
| 3,133,111 | 5/1964 | Wheeler | 260—448.8 |
| 3,190,903 | 6/1965 | Koprick et al. | 260—448.8 |
| 3,225,018 | 12/1965 | Zutty | 260—448.8 XR |
| 3,402,192 | 9/1968 | Haluska | 260—448.2 |

DELBERT E. GANTZ, Primary Examiner
PAUL F. SHAVER, Assistant Examiner

U.S. Cl. X.R.

252—351; 260—448.2, 827